United States Patent
Palanki et al.

(10) Patent No.: US 10,305,618 B2
(45) Date of Patent: May 28, 2019

(54) TRANSMISSION AND DETECTION OF OVERHEAD CHANNELS AND SIGNALS IN A WIRELESS NETWORK

(71) Applicant: QUALCOMM Incorporated, San Diego, CA (US)

(72) Inventors: Ravi Palanki, Cupertino, CA (US); Aamod Khandekar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/011,088

(22) Filed: Jan. 29, 2016

(65) Prior Publication Data

US 2016/0149659 A1 May 26, 2016

Related U.S. Application Data (62) Division of application No. 12/770,453, filed on Apr. 29, 2010, now Pat. No. 9,253,651.

(Continued)

(51) Int. Cl.
*H04J 11/00* (2006.01)
*H04B 1/7107* (2011.01)
(Continued)

(52) U.S. Cl.
CPC .......... *H04J 11/005* (2013.01); *H04B 1/7107* (2013.01); *H04J 11/004* (2013.01);
(Continued)

(58) Field of Classification Search
CPC . H04B 1/7097; H04B 1/7107; H04J 11/0023; H04L 25/03821; H04L 25/0328;
(Continued)

(56) References Cited

U.S. PATENT DOCUMENTS

| 8,335,176 B2 | 12/2012 | Ji et al. |
| 9,253,651 B2 | 2/2016 | Palanki et al. |

(Continued)

FOREIGN PATENT DOCUMENTS

| CN | 1478331 A | 2/2004 |
| CN | 1989775 A | 6/2007 |

(Continued)

OTHER PUBLICATIONS

International Search Report and Written Opinion—PCT/US2010/033321, International Search Authority—European Patent Office—dated Mar. 1, 2011.

(Continued)

*Primary Examiner* — Salvador E Rivas
(74) *Attorney, Agent, or Firm* — Norton Rose Fulbright LLP (57) ABSTRACT

Techniques for transmitting and detecting for overhead channels and signals in a wireless network are described. In an aspect, a base station may blank (i.e., not transmit) at least one overhead transmission on certain resources in order to detect for the at least one overhead transmission of another base station. In one design, the base station may (i) send the overhead transmission(s) on a first subset of designated resources and (ii) blank the overhead transmission(s) on a second subset of the designated resources. The designated resources may be resources on which the overhead transmission(s) are sent by macro base stations. The base station may detect for the overhead transmission(s) from at least one other base station on the second subset of the designated resources. In another aspect, the base station may transmit the overhead transmission(s) on additional resources different from the designated resources.

4 Claims, 9 Drawing Sheets

Related U.S. Application Data (60) Provisional application No. 61/174,755, filed on May 1, 2009.

(51) Int. Cl.
| | | |
|---|---|---|
| *H04L 5/00* | (2006.01) | |
| *H04W 24/00* | (2009.01) | |
| *H04W 72/08* | (2009.01) | |
| *H04B 1/7097* | (2011.01) | |
| *H04W 48/08* | (2009.01) | |

(52) U.S. Cl.
CPC ........ *H04J 11/0023* (2013.01); *H04J 11/0069* (2013.01); *H04L 5/0048* (2013.01); *H04L 5/0053* (2013.01); *H04W 24/00* (2013.01); *H04W 72/082* (2013.01); *H04B 1/7097* (2013.01); *H04B 2201/70702* (2013.01); *H04W 48/08* (2013.01)

(58) Field of Classification Search
CPC .............. H04L 5/0053; H04W 56/001; H04W 52/0238; H04W 72/082
See application file for complete search history.

(56) References Cited

U.S. PATENT DOCUMENTS

| | | | | |
|---|---|---|---|---|
| 2004/0008693 | A1* | 1/2004 | Grove | H04L 47/10 370/395.52 |
| 2004/0247020 | A1* | 12/2004 | Mills | H04B 1/692 375/148 |
| 2005/0075077 | A1* | 4/2005 | Mach | H04B 1/1027 455/67.13 |
| 2005/0118946 | A1 | 6/2005 | Colban et al. | |
| 2005/0254555 | A1 | 11/2005 | Teague et al. | |
| 2005/0272432 | A1 | 12/2005 | Ji et al. | |
| 2005/0277425 | A1 | 12/2005 | Niemela et al. | |
| 2006/0146740 | A1* | 7/2006 | Sheynman | H04H 20/59 370/312 |
| 2008/0130593 | A1 | 6/2008 | Scheinert et al. | |
| 2008/0151743 | A1 | 6/2008 | Tong et al. | |
| 2009/0011762 | A1* | 1/2009 | Han | H04B 1/70735 455/434 |
| 2009/0190538 | A1 | 7/2009 | Hasegawa | |
| 2009/0252077 | A1 | 10/2009 | Khandekar et al. | |
| 2009/0274037 | A1 | 11/2009 | Lee et al. | |
| 2010/0067627 | A1* | 3/2010 | Lincoln | H04L 1/20 375/346 |
| 2010/0080139 | A1 | 4/2010 | Palanki et al. | |
| 2010/0118989 | A1 | 5/2010 | Sayana et al. | |
| 2010/0172311 | A1 | 7/2010 | Agrawal et al. | |
| 2010/0272034 | A1 | 10/2010 | Imai et al. | |
| 2011/0190003 | A1 | 8/2011 | Hiltunen et al. | |

FOREIGN PATENT DOCUMENTS

| | | |
|---|---|---|
| CN | 101189903 A | 5/2008 |
| JP | 2009081535 A | 4/2009 |
| WO | WO-0232003 A1 | 4/2002 |
| WO | WO-2004028005 A1 | 4/2004 |
| WO | WO-2005062798 A2 | 7/2005 |
| WO | WO-2006124204 | 11/2006 |
| WO | WO-2007124111 A2 | 11/2007 |
| WO | WO-2009041069 A1 | 4/2009 |
| WO | WO-2009126586 A2 | 10/2009 |
| WO | WO-2009126658 | 10/2009 |
| WO | WO-2010039738 | 4/2010 |

OTHER PUBLICATIONS

Lge et al., "Text proposal for PHICH to RE mapping with cell ID", 3GPP TSG RAN WG1 #52, R1-081063 Sorrento, Italy Feb. 11 to 15, 2008.

Motorola, "Long Term Evolution (LTE): A Technical Overview", 2007, pp. 1-15.

Partial International Search Report—PCT/US2010/033321—International Search Authority, European Patent Office, dated Oct. 13, 2010.

Qualcomm Europe: "Coordinated Multi-Point downlink transmission i n LTE-Advanced" 3GPP Draft; R1-084400 Comp, 3rd Generation Partnership Project (3GPP), Mobile Competence Centre ; 650, Route Des Lucioles ; F-06921 Sophia-Antipolis Cedex ; France, no. Prague, Czech Republic; Nov. 5, 2008, Nov. 5, 2008 (Nov. 5, 2008), XP050317663.

Qualcomm Europe, "Introduction of blank subframe indication into SIB2", 3GPP TSG-RAN WG2 #64, R2-086572, 3GPP, Nov. 14, 2008.

Qualcomm Europe, "Specifying blank subframes for efficient support of relays", 3GPP TSG-RAN WG1 #55, R1-084385, 3GPP, Nov. 14, 2008.

Qualcomm Europe: "Range expansion for efficient support of heterogeneous networks" 3GPP Draft; R1-083813, 3rd Generation Partnership Project (3GPP), Mobile Competence Centre ; 650, Route Des Lucioles ; F-06921 Sophia-Antipolis Cedex ; France, no. Prague, Czech Republic; (Sep. 29,-Oct. 3, 2008), Sep. 24, 2008, Sep. 24, 2008 (Sep. 24, 2008), XP050317137.

Qualcomm Europe, "Support of REL-8 Ues by LTE-A Relays", 3GPP RAN WG1 R1-084384, Meeting 55, 3GPP RAN WG1, Nov. 10-14, 2008.

Taiwan Search Report—TW099113964—TIPO—dated Feb. 19, 2013.

Wu, C.C., et al., "Intercell interference cancellation for TD-CDMA mobile systems" Electronics Letters, IEE Stevenage, GB, vol. 36, No. 23, Nov. 9, 2000 (Nov. 9, 2000), pp. 1960-1961, XP006015935, ISSN: 0013-5194, DOI: DOI:10.1049/EL:20001381.

Xenofon G Doukopoulos, et al., "Intercell Interference Cancellation for MC-CDMA Systems", IEEE VTS Vehicular Technology Conference Proceedings, IEEE, US, Apr. 1, 2007 (Apr. 1, 2007), pp. 1612-1616, XP031092902, ISSN: 1550-2252 ISBN: 978-1-4244-0266-3.

* cited by examiner

TRANSMISSION AND DETECTION OF OVERHEAD CHANNELS AND SIGNALS IN A WIRELESS NETWORK

The present application for patent is a Divisional of patent application Ser. No. 12/770,453 entitled "TRANSMISSION AND DETECTION OF OVERHEAD CHANNELS AND SIGNALS IN A WIRELESS NETWORK" filed Apr. 29, 2010, assigned U.S. Pat. No. 9,253,651 with an issue date of Feb. 2, 2016, and assigned to the assignee hereof, which in turn claims priority to provisional U.S. Application Ser. No. 61/174,755, entitled "CELL ACQUISITION AND SYSTEM INFORMATION BLOCK DETECTION," filed May 1, 2009, assigned to the assignee hereof and incorporated herein by reference.

BACKGROUND

I. Field

The present disclosure relates generally to communication, and more specifically to techniques for transmitting and receiving overhead channels and signals in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may transmit various overhead channels and signals to UEs within its coverage. The overhead signals may be used by the UEs for acquisition and/or other purposes. The overhead channels may carry system information, which may allow the UEs to communicate with the base station. It may be desirable to efficiently transmit and receive overhead channels and signals.

SUMMARY

Techniques for transmitting and detecting for overhead channels and signals in a wireless network are described herein. A base station may desire to detect for overhead channels and signals of another base station, for example, in order to acquire information about that base station and set its own parameters accordingly. However, the base station may need to transmit the overhead channels and signals to its UEs.

In an aspect, a base station may blank (i.e., not transmit) its overhead channels and signals on certain resources in order to detect for overhead channels and signals of another base station. In one design, the base station may send at least one overhead transmission on a first subset of designated resources and may blank the at least one overhead transmission on a second subset of the designated resources. The designated resources may be resources on which the at least one overhead transmission is sent by macro base stations. The at least one overhead transmission may comprise a primary synchronization signal (PSS), or a secondary synchronization signal (SSS), or a broadcast channel, or a cell-specific reference signal (CRS), or some other overhead transmission, or a combination thereof. The base station may detect for the at least one overhead transmission from at least one other base station on the second subset of the designated resources.

In another aspect, a base station may transmit its overhead channels and signals on additional resources different from the designated resources. In one design, the base station may determine a set of resources not used for sending at least one overhead transmission by macro base stations. The station may send the at least one overhead transmission on the set of resources. The station may detect for the at least one overhead transmission from at least one base station on at least a subset of the designated resources.

In one design, a UE (or a base station) may determine resources on which to detect for at least one overhead transmission from a base station. The base station may send the at least one overhead transmission on designated resources with blanking and/or on additional resources different from the designated resources. The UE may detect for the at least one transmission from the base station on the determined resources.

In yet another aspect, a UE (or a base station) may detect for overhead channels and signals of a base station with interference cancellation. In one design, the UE may obtain a received signal comprising at least one overhead transmission from a plurality of base stations. The at least one overhead transmission may comprise a synchronization signal, or a broadcast channel, or some other overhead transmission, or a combination thereof. The plurality of base stations may comprise at least one interfering base station and at least one desired base station. The UE may estimate interference due to the at least one overhead transmission from the at least one interfering base station and may cancel the estimated interference from the received signal to obtain an interference-canceled signal. The UE may then detect for the at least one overhead transmission from the at least one desired base station based on the interference-canceled signal.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
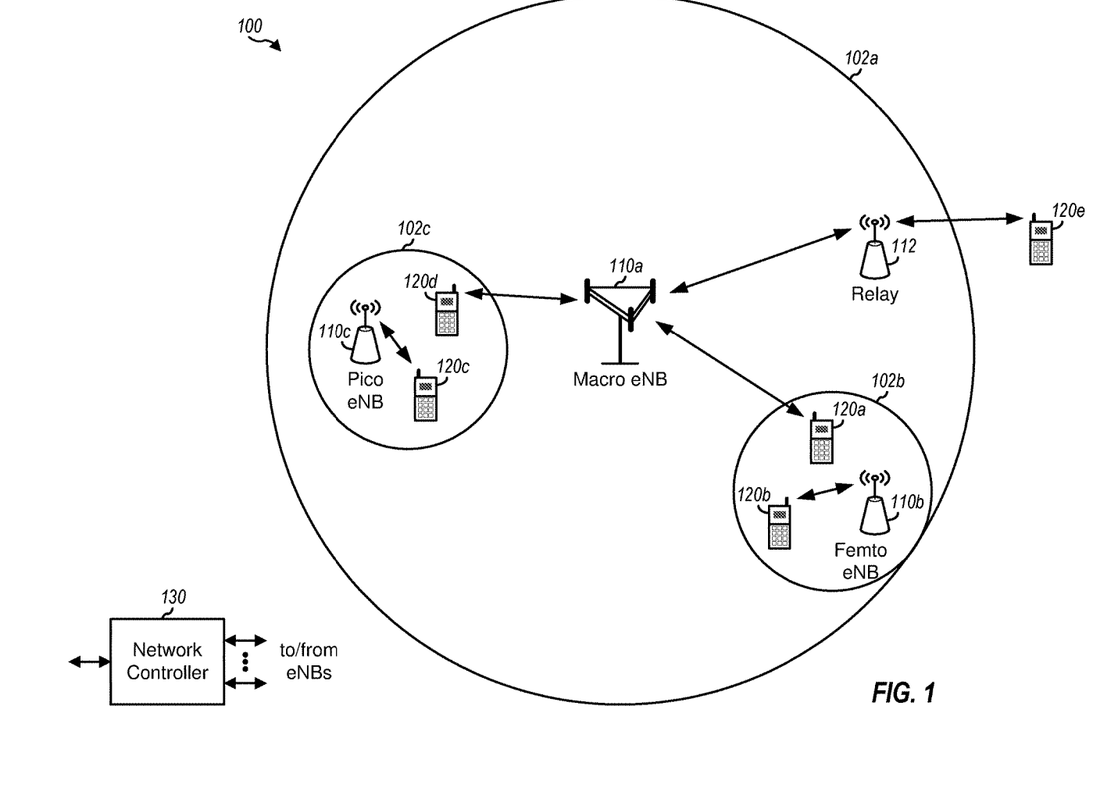
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, eNB 110a may be a macro eNB for a macro cell 102a, eNB 110b may be a femto eNB for a femto cell 102b, and eNB 110c may be a pico eNB for a pico cell 102c. An eNB may support one or multiple (e.g., three) cells. The terms "eNB" and "base station" may be used interchangeably herein.

Wireless network 100 may also include relay stations. A relay station may be an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 112 may communicate with macro eNB 110a and a UE 120e in order to facilitate communication between eNB 110a and UE 120e. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB.

Figure 2:
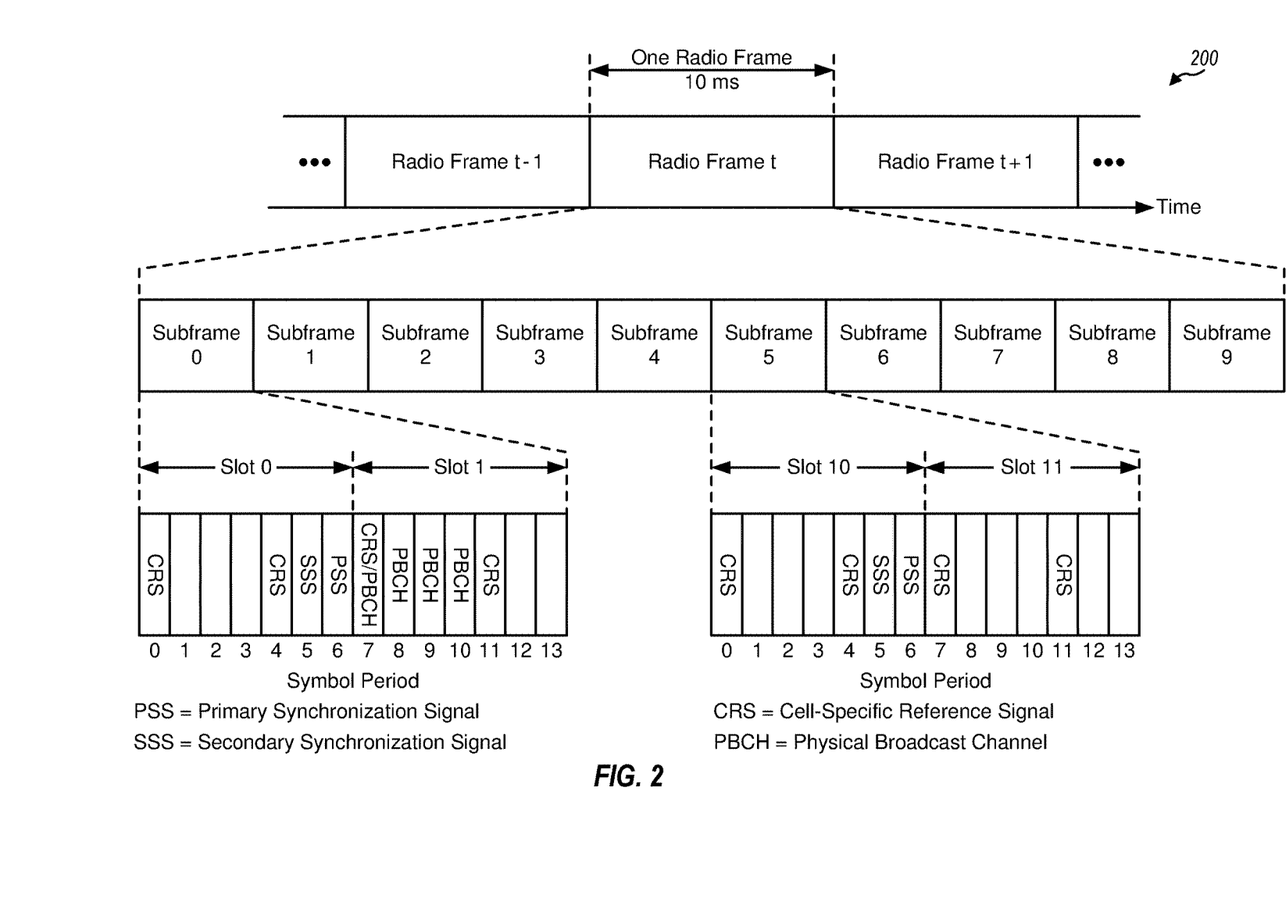
FIG. 2 shows an exemplary frame structure.

FIG. 2 shows an exemplary frame structure 200 for the downlink in LTE.

The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

An eNB may transmit various overhead channels and signals on the downlink to support communication for UEs. The overhead channels may include broadcast channels and/or other channels carrying system information. The overhead signals may include synchronization signals used for system/cell acquisition, reference signals used for channel quality measurements and channel estimation, and/or other signals.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 2. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs for channel estimation, channel quality measurement, and/or other functions.

The eNB may also transmit a Physical Broadcast Channel (PBCH) in symbol periods 0 to 3 in slot 1 of subframe 0 in certain radio frames. The PBCH may carry some system information such as a Master Information Block (MIB). The eNB may transmit other system information such as System Information Blocks (SIBs) on a Physical Downlink Shared Channel (PDSCH) in certain subframes. The MIB and SIBs may allow the UEs to receive transmissions on the downlink and/or send transmissions on the uplink.

Figure 3:
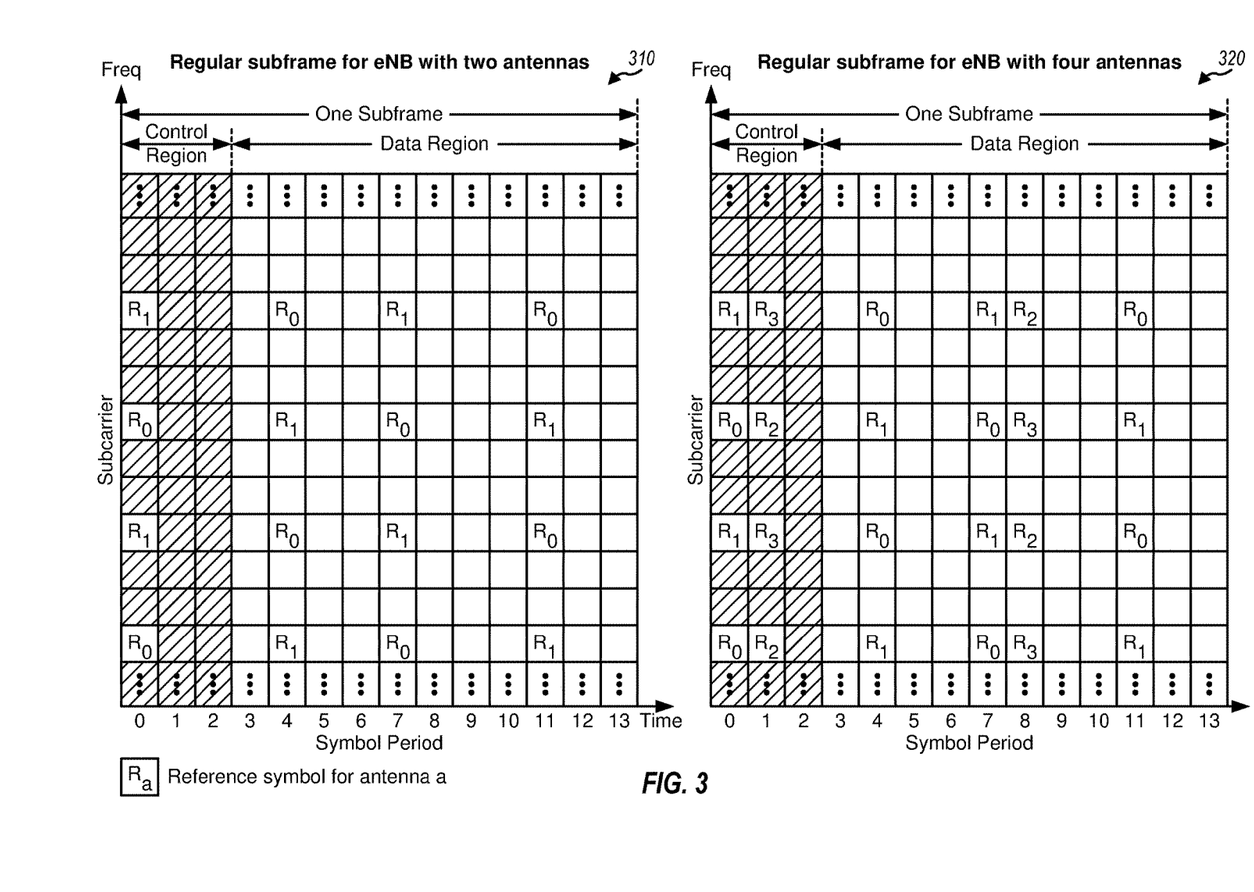
FIG. 3 shows two exemplary subframe formats.

FIG. 3 shows two exemplary subframe formats 310 and 320 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 310 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 3, for a given resource element with label $R_a$, a modulation symbol may be transmitted on that resource element from antenna a, and no modulation symbols may be transmitted on that resource element from other antennas. Subframe format 320 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 310 and 320, resource elements not used for the CRS may be used to transmit data and/or control information.

The PSS, SSS, CRS and PBCH in LTE are described in 3GPP TS 36.211, entitled "Evolved Universal Terrestrial Radio Access (E-UTRA); Physical Channels and Modulation," which is publicly available. The MIB and SIBs are described in 3GPP TS 36.331, entitled "Evolved Universal Terrestrial Radio Access (E-UTRA) Radio Resource Control (RRC); Protocol specification," which is also publicly available.

In a heterogeneous network, entities other than UEs may desire to detect for overhead channels and signals from eNBs. This may be the case, for example, in a self-synchronizing network where a first eNB (e.g., a pico eNB, a femto eNB, or a relay eNB) may desire to detect for overhead channels and signals of a second eNB (e.g., a macro eNB) to obtain information about the second eNB and set parameters of the first eNB accordingly. However, the first eNB may need to transmit its own overhead channels and signals. Simultaneous transmission and reception of overhead channels and signals may be problematic in a synchronous network in which all eNBs transmit their overhead channels and signals at approximately the same time.

In an aspect, an eNB may blank (i.e., not transmit or avoid transmitting) its overhead channels and signals on certain resources (e.g., in certain symbol periods of certain subframes) in order to detect for overhead channels and signals of another eNB. An eNB that detects for or monitors overhead channels and signals of another eNB may be referred to as a tracking eNB. In general, a tracking eNB may be a macro eNB, a pico eNB, a femto eNB, a relay eNB, or some other entity. Blanking refers to non-transmission of a channel or signal.

Figure 4:
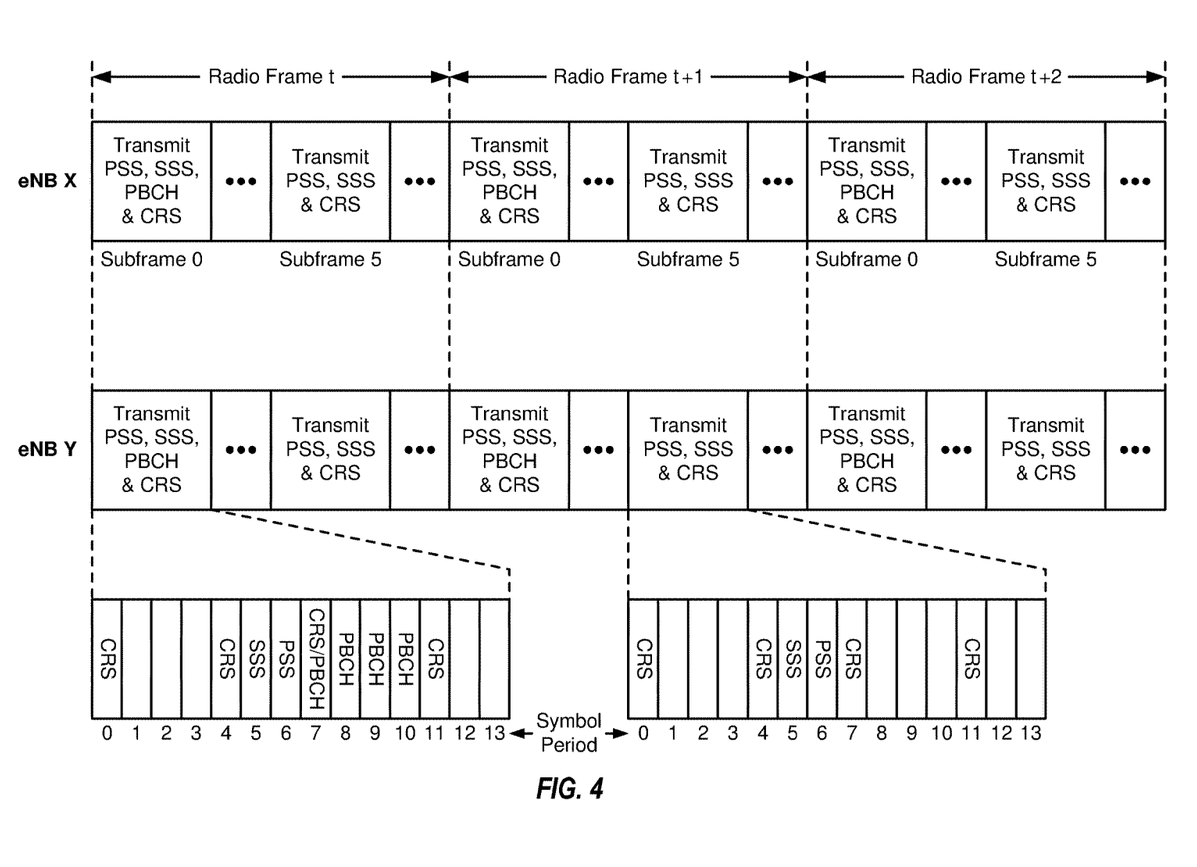
FIG. 4 shows two base stations sending overhead transmissions.

FIG. 4 shows transmission of overhead channels and signals by two eNBs X and Y in a synchronous network. eNBs X and Y may have similar frame timing in a synchronous network, and subframe 0 may start at approximately the same time for both eNBs. Each eNB may transmit the PSS, SSS, PBCH and CRS in designated symbol periods of subframe 0 of each radio frame. Each eNB may also transmit the PSS, SSS and CRS in designated symbol periods of subframe 5 of each radio frame. Each eNB may also transmit the CRS in designated symbol periods of subframes 1 through 4 and subframes 6 through 9 of each radio frame (not shown in FIG. 4).

Figure 5:
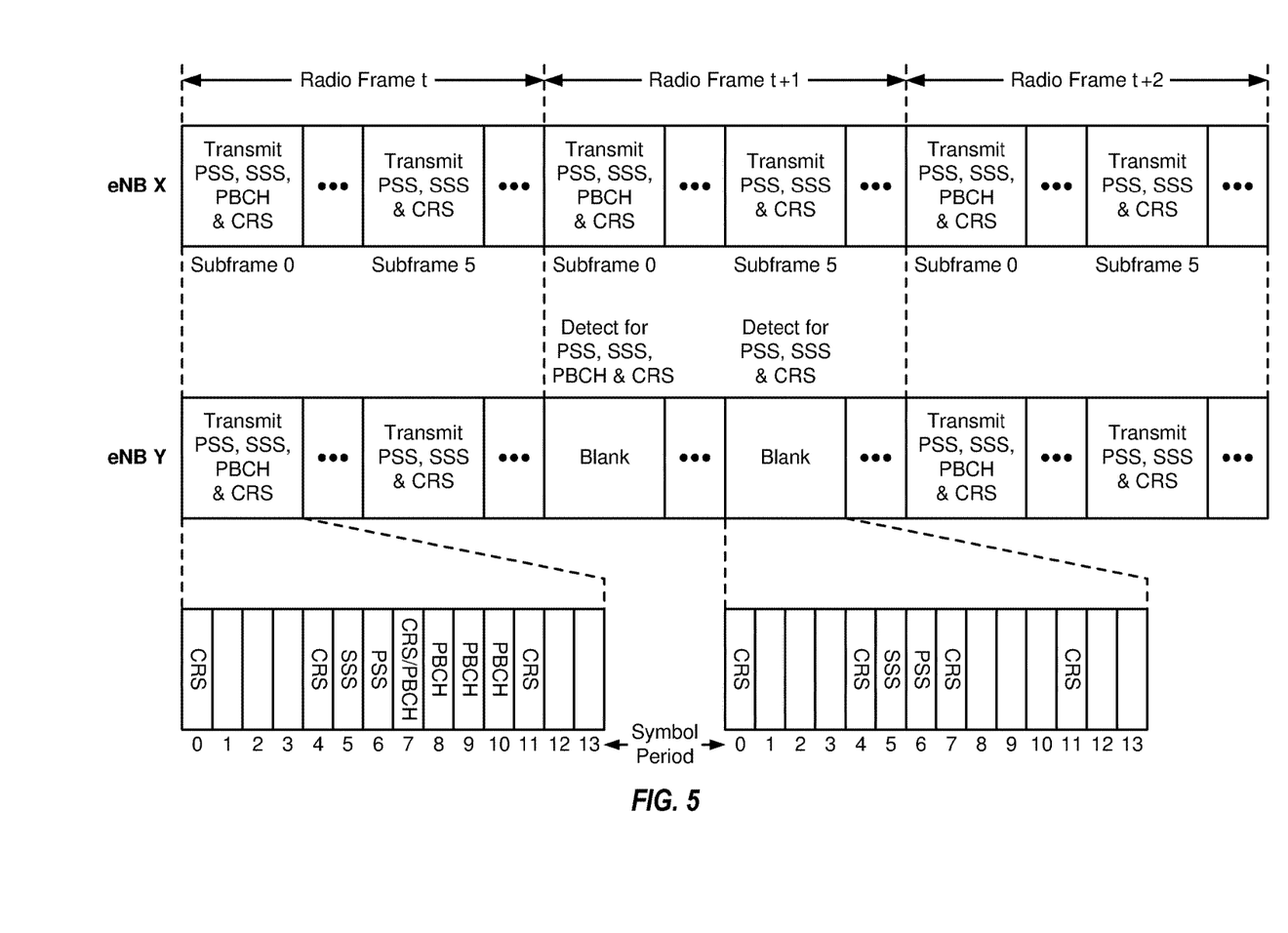
FIG. 5 shows a base station sending overhead transmissions with blanking.

FIG. 5 shows transmission of overhead channels and signals by tracking eNB Y with blanking in order to detect for overhead channels and signals of another eNB X. eNB X may transmit each overhead channel/signal (e.g., the PSS, SSS, PBCH or CRS) in each subframe in which that overhead channel/signal is to be transmitted (e.g., as specified in the LTE standard). eNB Y may transmit each overhead channel/signal in some subframes in which that overhead channel/signal is to be transmitted and may blank that overhead channel/signal in remaining subframes. In the example shown in FIG. 5, eNB Y may transmit the PSS, SSS, PBCH and CRS in subframe 0 and may transmit the PSS, SSS and CRS in subframe 5 of radio frame t. eNB Y may blank the PSS, SSS, PBCH and CRS in subframes 0 and 5 of radio frame t+1 and may instead detect for the PSS, SSS, PBCH and CRS of another eNB in this radio frame. eNB Y may again transmit the PSS, SSS, PBCH and CRS in subframe 0 and may transmit the PSS, SSS and CRS in subframe 5 of radio frame t+2.

In general, a tracking eNB may blank its overhead channels and signals with any periodicity and for any duration. The periodicity and duration of blanking may be dependent on various factors such as the channel conditions observed by the tracking eNB, mobility of the tracking eNB, operational requirements of the tracking eNB, etc. For example, the tracking eNB may detect for the overhead channels and signals of another eNB less frequently (e.g., once every few minutes) if the tracking eNB is stationary or more frequently if it is mobile. The tracking eNB may also detect for the overhead channels and signals of another eNB for a shorter duration (e.g., one subframe) if the channel conditions are good or for a longer duration if the channel conditions are poor. Channel conditions may be quantified by signal-to-noise-and-interference ratio (SINR) and/or other metrics. The tracking eNB may know where and when the overhead channels and signals of a tracked eNB are sent. The tracking eNB may decide to track some or all of the instances of the overhead channels and signals of the tracked eNB. The periodicity of tracking may also be dependent on expected impact on the UEs served by the tracking eNB. For example, the tracking eNB may track more frequently if it is not serving any UEs and may track less frequently if it is serving at least one UE.

Blanking may also be used to assist UEs and eNBs detect for overhead channels and signals of other eNBs in dominant interference scenarios. A UE may operate in a dominant interference scenario in which the UE may observe high interference from one or more interfering eNBs. A dominant interference scenario may occur due to range extension, which is a scenario in which a UE connects to an eNB with lower pathloss and lower SINR. For example, in FIG. 1, UE 120c may receive signals from macro eNB 110a and pico eNB 110c and may obtain lower received power for eNB 110c than eNB 110a. Nevertheless, it may be desirable for UE 120c to connect to pico eNB 110c if the pathloss for eNB 110c is lower than the pathloss for macro eNB 110a. This may be the case due to pico eNB 110c having a lower transmit power level as compared to macro eNB 110a. By having UE 120c connect to pico eNB 110c with lower pathloss, less interference may be caused to the wireless network to achieve a given data rate.

A dominant interference scenario may also occur due to restricted association. For example, in FIG. 1, UE 120a may be close to femto eNB 110b and may have high received power for eNB 110b. However, femto eNB 110b may have restricted access, and UE 120a may not be allowed to connect to eNB 110b. UE 120a may then connect to macro eNB 110a with lower received power and may observe high interference from femto eNB 110b.

In general, a dominant interference scenario may exist in a heterogeneous network when either a UE or an eNB is trying to detect for overhead channels and signals of another eNB. For example, if eNBs 110a, 110b and 110c transmit their overhead channels and signals at the same time, then UE 120a may have difficulty detecting for the overhead channels and signals of its serving eNB 110a due to high interference from interfering eNB 110b. Similarly, UE 120c may have difficulty detecting for the overhead channels and signals of its serving eNB 110c due to high interference from interfering eNB 110a. Dominant interference scenarios may be mitigated as described below.

In one design, blanking may be performed based on blanking patterns, which may also be referred to as reuse patterns. In this design, different eNBs may blank their overhead channels and signals based on different blanking patterns, which may mitigate dominant interference scenarios. A blanking pattern for an eNB may indicate specific resources (e.g., specific subframes) in which the eNB will not transmit its overhead channels and signals. Different eNBs may blank at different times based on different blanking patterns. The blanking pattern for each eNB may or may not be known to the UEs in advance.

Blanking patterns for different eNBs may be defined in various manners. In one design, blanking patterns may be pseudo-randomly defined, which may randomize collisions between the overhead channels and signals of different eNBs. An eNB may pseudo-randomly select subframes in which the eNB will not transmit its overhead channels and signals. In another design, blanking patterns may be predefined to minimize or avoid collisions between the overhead channels and signals of different eNBs. Blanking patterns for different eNBs may also be defined in other manners. In any case, an eNB may transmit its overhead channels and signals in subframes determined based on its blanking pattern.

The use of different blanking patterns for different eNBs may improve detection of overhead channels and signals from eNBs in dominant interference scenarios. For example, a UE in the vicinity of a strong interfering eNB X may still be able to detect for the overhead channels and signals of another eNB Y if interfering eNB X blanks its overhead channels and signals in some subframes.

In another design, blanking may be performed on-demand when requested. In this design, an eNB may be requested by a UE or some other entity (e.g., another eNB) to blank its overhead channels and signals in order to allow for detection of overhead channels and signals of other eNBs. For example, a UE may move into the coverage of an eNB, which may be a femto eNB that the UE is barred from accessing. The UE may ask the eNB to blank some resources so that the UE can detect either a macro eNB or its own femto eNB. As another example, different eNBs may blank some overhead signals (e.g., synchronization signals) in a pseudo-random or planned manner A UE may be able to detect a weak eNB due to the blanking by the different eNBs. The UE may then request a strong eNB to further blank its overhead channels and signals so that the UE can detect such channels and signals from the weak eNB. In any case, a request for blanking may be sent via lower layer signaling or upper layer signaling. The lower layer signaling may comprise Layer 1 signaling sent on a Physical Uplink Control Channel (PUCCH), or a Physical Random Access Channel (PRACH), or a sounding reference signal (SRS), or some other channel or signal. The upper layer signaling may comprise Layer 3 signaling, e.g., Radio Resource Control (RRC) signaling.

The wireless network may support operation on multiple (K) carriers. Each carrier may correspond to a range of frequencies that may be used for communication. Blanking may be performed in various manners with multiple carriers.

In one design, blanking may be performed across carriers. For example, an eNB may transmit its overhead channels and signals on a subset of the K total carriers at any given time. Interference may then be removed from each carrier on which the eNB does not transmit the overhead channels and signals. The eNB may blank one or more carriers, which may be selected in a pseudo-random manner or based on a predetermined pattern.

In another design, each eNB may be assigned an anchor carrier on which the eNB can transmit its overhead channels and signals. eNBs that may cause high interference (e.g., two femto eNBs located near each other) may be assigned different anchor carriers. For example, eNB X may cause high interference to a UE served by eNB Y and may be assigned an anchor carrier different from that of eNB Y.

The eNBs may transmit their overhead channels and signals in various manners with anchor carriers. In a first design, each eNB may transmit its overhead channels and signals on only the anchor carrier assigned to that eNB and in each subframe in which the overhead channels and signals are to be transmitted. In a second design, each eNB may occasionally blank its overhead channels and signals on its anchor carrier, e.g., in subframes that may be selected in a pseudo-random manner or based on a blanking pattern. In a third design, each eNB may transmit its overhead channels and signals on its anchor carrier (e.g., with or without blanking) and may occasionally transmit its overhead channels and signals on one or more additional carriers on which dominant interferers (if any) may not be transmitting. Each eNB may also transmit its overhead channels and signals in other manners.

The second and third designs described above may be able to address certain interference conditions. For example, a UE may enter the coverage area of an eNB X or may come out of an idle state while in the coverage area of eNB X. The UE may desire to access eNB X, which may observe high interference from another eNB Y. eNBs X and Y may be two femto eNBs located near each another. In this case, desired eNB X may not be detectable by the UE if eNB X is assigned the same anchor carrier as interfering eNB Y. This scenario may be addressed by the second design described above. In this case, the UE may be able to detect the overhead channels and signals of the desired eNB X on the anchor carrier in subframes in which interfering eNB Y blanks its overhead channels and signals. This scenario may also be addressed by the third design described above. In this case, the UE may be able to detect the overhead channels and signals of the desired eNB X on another carriers. For both designs, subsequent to detection, all eNBs in a group of interfering eNBs may be assigned different anchor carriers.

In another aspect, an eNB may transmit its overhead channels and signals on additional resources, which may be different from designated resources on which the overhead channels and signals are normally transmitted by eNBs. The designated resources may be specified in a standard, e.g., for macro eNBs. The additional resources may be resources not normally used by the macro eNBs to transmit their overhead channels and signals. In one design, an eNB may transmit its overhead channels and signals on both the designated resources and the additional resources. In this design, the eNB may or may not perform blanking for the overhead channels and signals transmitted on the designated resources. In another design, an eNB may transmit its overhead channels and signals on only the additional resources.

The additional resources may be selected in a pseudo-random manner or based on a predetermined pattern. In one design, an eNB may transmit its overhead channels and signals in one or more additional subframes. For example, an eNB may transmit its PSS and SSS in designated subframes 0 and 5 as well as additional subframes 1 and 6. In another design, an eNB may transmit its overhead channels and signals on one or more additional subbands. For example, an eNB may transmit its PSS and SSS in the designated center subband as well as one or more additional subbands, which may be adjacent to the center subband or located further away from the center subband. In yet another design, an eNB may transmit its overhead channels and signals on one or more additional resource blocks. The additional subframes, subbands, and/or resource blocks may or may not be known to the UEs.

An eNB may transmit its overhead channels and signals with time offset. In one design, the subframe timing of the eNB may be offset from the subframe timing of another eNB (e.g., a macro eNB). For example, subframe 0 of the eNB may be time aligned with subframe 1 of another eNB for a time offset of one subframe. The eNB may transmit its overhead channels and signals in its subframes 0, which may avoid the overhead channels and signals of the other eNB transmitted one subframe earlier. In another design, the symbol timing of the eNB may be offset from the symbol timing of another eNB. For example, symbol period 0 of the eNB may be time aligned with symbol period 6 of another eNB for a time offset of six symbol periods. The eNB may transmit its PSS, SSS, and PBCH starting in symbol period 5 of its subframes 0, which may avoid the PSS, SSS, and PBCH of the other eNB transmitted six symbol periods earlier. In general, the timing of an eNB may be offset from the timing of another eNB by one or more subframes and/or one or more symbol periods.

An eNB may transmit its overhead channels and signals with frequency offset. In one design, the center frequency of the eNB may be offset from the center frequency of another eNB. The eNB may transmit its overhead channels and signals on its center frequency, which may avoid the overhead channels and signals of another eNB transmitted on a different center frequency. In general, the bandwidth and center frequency of some eNBs (e.g., femto eNBs) may be different from those of other eNBs (e.g., macro eNBs) in order to avoid high interference to the overhead channels and signals of these eNBs.

Different eNBs may have different designated resources due to the use of time and/or frequency offset. Transmission of overhead channels and signals with time offset and/or frequency offset may be considered as a special case of a scheme in which an eNB transmits its overhead channels and signals on additional resources. For example, a femto eNB may have its subframe timing offset from that of a macro eNB. The designated resources for the femto eNB may then correspond to additional resources for the macro eNB.

In general, different eNBs may transmit their overhead channels and signals on different resource blocks, which may be selected in a pseudo-random manner or based on predetermined patterns. This may allow for orthogonalization of the overhead channels and signals from different eNBs.

An eNB may occasionally blank its overhead channels and signals and may not transmit the overhead channels and signals on all designated resources (e.g., in all subframes). This may be the case when the eNB tunes away to detect for overhead channels and signals of another eNB. UEs connected to the eNB may not receive the overhead channels and signals from the eNB whenever it blanks. Blanking of the overhead channels and signals by the eNB may adversely impact the operation of the UEs. The adverse effects due to blanking may be mitigated in various manners.

In one design, an eNB may declare each subframe in which the eNB blanks its overhead channels and signals as a multicast/broadcast single frequency network (MBSFN) subframe. An MBSFN subframe is a subframe normally used to send multicast and/or broadcast data to UEs. An MBSFN subframe may have the CRS transmitted in fewer symbol periods, e.g., in only symbol period 0 for two antennas and only symbol periods 0 and 1 for four antennas. In each MBSFN subframe, the UEs may receive the CRS in the first one or two symbol periods of the subframe and may ignore the remaining part of the subframe. In each MBSFN subframe, the eNB may use the CRS of another eNB for tracking, and the other eNB may not need to declare an MBSFN subframe.

In another design, a UE may be placed in a discontinuous reception (DRX) mode when its serving eNB blanks the overhead channels and signals. The UE may skip receiving the overhead channels and signals from the eNB while in the DRX mode and may sleep for a longer period of time.

In yet another design, an eNB may avoid scheduling UEs for data transmission in (and possibly near) subframes in which the eNB blanks its CRS. A UE may derive a channel estimate based on the CRS and may average the channel estimate across subframes in order to improve the quality of the channel estimate. The UE may use the channel estimate for demodulation of a data transmission sent to the UE. By not scheduling the UE for data transmission in (and possibly near) the subframes in which the CRS is not transmitted, adverse impact on data transmission to the UE may be mitigated. The eNB may also gradually lower its transmit power level prior to blanking and may thereafter increase its transmit power level to mimic a deep fade.

In yet another design, an eNB may blank certain overhead channels and signals in order to detect for the same overhead channels and signals from another eNB but may transmit remaining overhead channels and signals. For example, the eNB may blank the PSS and SSS in order to detect for the PSS and SSS of another eNB but may transmit the CRS to its UEs. The eNB may achieve time synchronization based on the PSS and SSS of another eNB. The PSS and SSS may occupy only the last two symbol periods of slots 0 and 10 in each radio frame, as shown in FIG. 2, and may not overlap the CRS in the time domain or the frequency domain. Thus, the eNB can transmit the CRS and still detect for the PSS and SSS of another eNB.

In yet another design, an eNB may inform UEs when the eNB will blank its overhead channels and signals. The eNB may advertise its blanking pattern or subframes in which it will blank its overhead channels and signals. The subframes to be blanked may be indicated explicitly or implicitly (e.g., as a function of subframe index). The UEs may receive the signaling from the eNB and may be aware of the subframes in which the eNB will blank the overhead channels and signals. The UEs may then avoid using these subframes for channel estimation and/or other purposes.

In yet another aspect, a UE may detect for overhead channels and signals of an eNB with interference cancellation. The UE may obtain a received signal comprising overhead channels and signals of one or more desired eNBs as well as one or more interfering eNBs. The UE may digitize the received signal and store the resultant samples. The UE may process the samples to detect for each interfering eNB of interest, which may have sufficiently strong received signal strength exceeding a particular threshold. For each detected interfering eNB, the UE may estimate the interference due to the overhead channels and signals of the interfering eNB and may cancel/subtract the estimated interference from the samples to obtain interference-canceled samples. The UE may repeat the detection and interference cancellation for each interfering eNB of interest. After canceling the interference from all interfering eNBs of interest, the UE may process the interference-canceled samples to detect for the overhead channels and signals of each desired eNB. The UE may be able to detect the overhead channels and signals of weaker desired eNBs by canceling the interference due to dominant interferers. A tracking eNB may detect for overhead channels and signals of another eNB with interference cancellation in similar manner.

Figure 6:
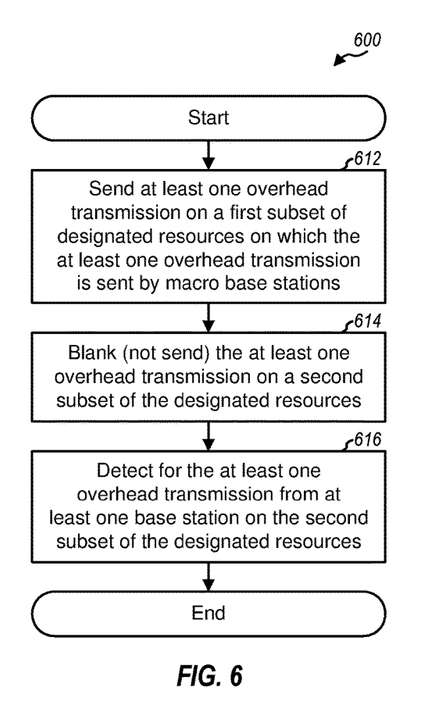
FIGS. 6 and 7 show a process and an apparatus, respectively, for sending at least one overhead transmission with blanking.

FIG. 6 shows a design of a process 600 for sending overhead transmissions in a wireless network. Process 600 may be performed by a station, which may be a femto base station/eNB, or a pico base station/eNB, or a relay base station/eNB, or some other entity. The station may send at least one overhead transmission on a first subset of designated resources (block 612). The designated resources may be resources on which the at least one overhead transmission is sent by macro base stations. The designated resources may also be specified in a standard, e.g., for macro base stations. The at least one overhead transmission may comprise a PSS, or an SSS, or a broadcast channel, or a CRS, or some other overhead transmission, or a combination thereof. The station may blank (i.e., not send or avoid transmitting) the at least one overhead transmission on a second subset of the designated resources (block 614). The station may detect for the at least one overhead transmission from at least one base station on the second subset of the designated resources (block 616).

In one design, the station may pseudo-randomly select the second subset of the designated resources. In another design, the station may determine the second subset of the designated resources based on a blanking pattern assigned to the station. Different base stations may be assigned different blanking patterns. In yet another design, the station may receive a request to blank the at least one overhead transmission on at least some of the designated resources. The station may then blank the at least one overhead transmission on the second subset of the designated resources in response to the request.

In one design, for multi-carrier operation, the station may send the at least one overhead transmission on at least one carrier among a plurality of carriers. The station may blank the at least one overhead transmission on at least one remaining carrier. The station may select the at least one subcarrier in a pseudo-random manner or based on a predetermined pattern. In another design, the station may send the at least one overhead transmission on an anchor carrier among the plurality of carriers. Neighboring base stations may be assigned different anchor carriers. The station may also send the at least one overhead transmission on at least one additional carrier. The station may or may not perform blanking on the anchor carrier and the at least one additional carrier.

In one design, the designated resources may comprise designated subframes in which the at least one overhead transmission is sent by the macro base stations. The at least one overhead transmission may be sent in a first subset of the designated subframes and may be blanked in a second subset of the designated subframes. In one design, the station may declare each subframe in which the at least one overhead transmission is blanked as an MBSFN subframe.

In one design, the station may avoid scheduling UEs for data transmission on the second subset of the designated resources. In another design, the station may broadcast signaling to convey the second subset of the designated resources to UEs. In yet another design, the station may blank the PSS and SSS but may transmit the CRS on the second subset of the designated resources. The station may also perform other actions to mitigate adverse effects to UEs due to blanking.

Figure 7:
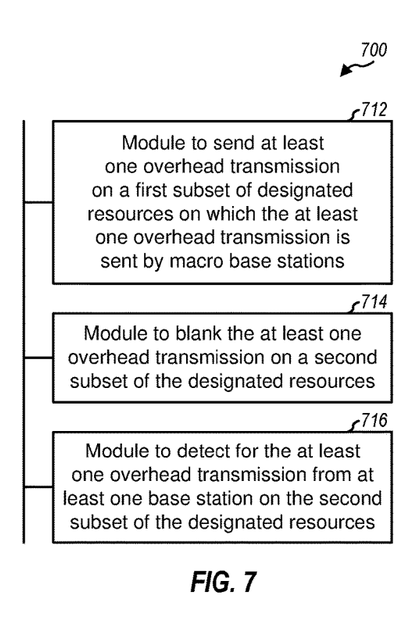

FIG. 7 shows a design of an apparatus 700 for sending overhead transmissions in a wireless network. Apparatus 700 includes a module 712 to send at least one overhead transmission on a first subset of designated resources on which the at least one overhead transmission is sent by macro base stations, a module 714 to blank the at least one overhead transmission on a second subset of the designated resources, and a module 716 to detect for the at least one overhead transmission from at least one base station on the second subset of the designated resources.

Figure 8:
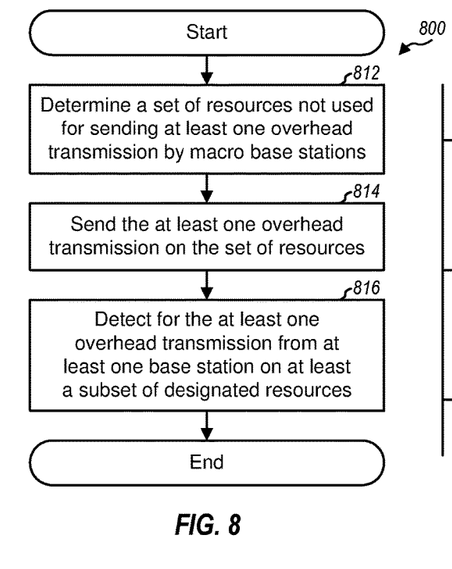
FIGS. 8 and 9 show a process and an apparatus, respectively, for sending at least one overhead transmission on additional resources.

FIG. 8 shows a design of a process 800 for sending overhead transmissions in a wireless network. Process 800 may be performed by a station, which may be a femto base station/eNB, or a pico base station/eNB, or a relay base station/eNB, or some other entity. The station may determine a set of resources not used for sending at least one overhead transmission by macro base stations (block 812). The station may send the at least one overhead transmission on the set of resources (block 814). The station may also send the at least one overhead transmission on at least some of the designated resources on which the at least one overhead transmission is sent by the macro base stations. The station may detect for the at least one overhead transmission from at least one base station on at least a subset of the designated resources (block 816).

In one design, the set of resources may be selected pseudo-randomly. In another design, the set of resources may be determined based on a predetermined pattern. In yet another design, the set of resources may comprise a set of subframes determined based on a subframe offset relative to subframes of the macro base stations. In yet another design, the set of resources may be offset in frequency from the designated resources. The set of resources may also be determined in other manners.

Figure 9:
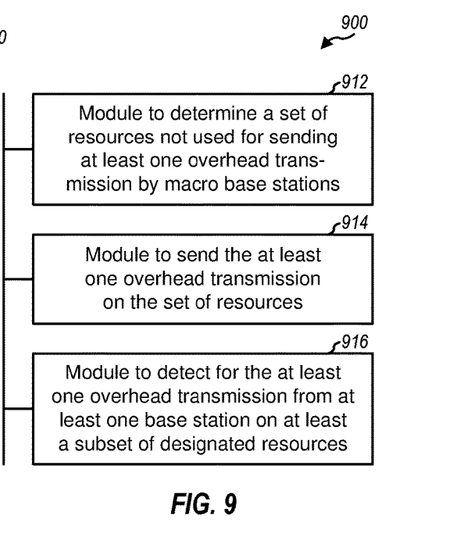

FIG. 9 shows a design of an apparatus 900 for sending overhead transmissions in a wireless network. Apparatus 900 includes a module 912 to determine a set of resources not used for sending at least one overhead transmission by macro base stations, a module 914 to send the at least one overhead transmission on the set of resources, and a module 916 to detect for the at least one overhead transmission from at least one base station on at least a subset of designated resources on which the at least one overhead transmission is sent by the macro base stations.

Figure 10:
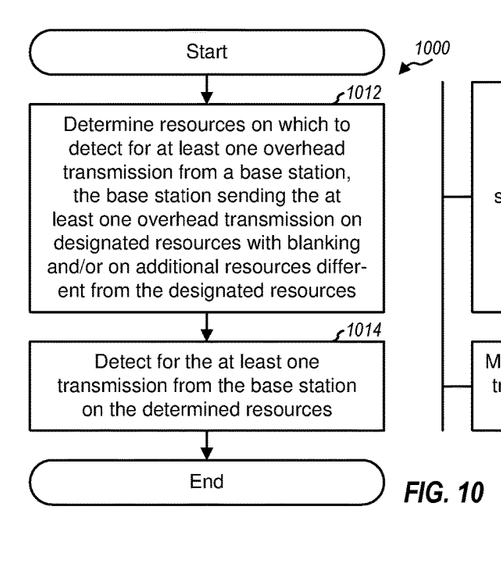
FIGS. 10 and 11 show a process and an apparatus, respectively, for receiving at least one overhead transmission.

FIG. 10 shows a design of a process 1000 for receiving overhead transmissions in a wireless network. Process 1000 may be performed by a UE (as described below), or a base station/eNB, or some other entity. The UE may determine resources on which to detect for at least one overhead transmission from a base station (block 1012). The base station may send the at least one overhead transmission on designated resources with blanking and/or on additional resources different from the designated resources. The designated resources may be resources on which the at least one overhead transmission is sent by macro base stations. The UE may detect for the at least one transmission from the base station on the determined resources (block 1014).

In one design, the base station may blank the at least one overhead transmission on resources selected pseudo-randomly or determined based on a blanking pattern. In another design, the base station may send the at least one overhead transmission on the additional resources selected pseudo-randomly or determined based on a predetermined pattern. In one design, the UE may send a request to blank the at least one overhead transmission on at least some of the designated resources. The base station may then blank the at least one overhead transmission on at least a subset of the designated resources in response to the request.

In one design, the UE may operate in a DRX mode in subframes in which the at least one overhead transmission is blanked by the base station. The UE may sleep through these subframes.

Figure 11:
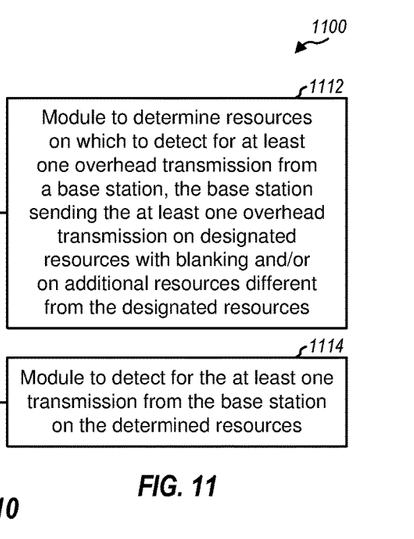

FIG. 11 shows a design of an apparatus 1100 for receiving overhead transmissions in a wireless network. Apparatus 1100 includes a module 1112 to determine resources on which to detect for at least one overhead transmission from a base station, the base station sending the at least one overhead transmission on designated resources with blanking and/or on additional resources different from the designated resources, and a module 1114 to detect for the at least one transmission from the base station on the determined resources.

Figure 12:
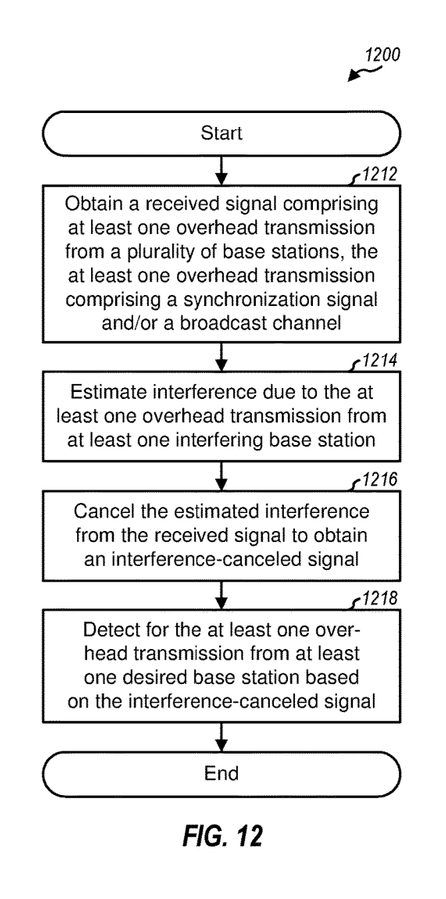
FIGS. 12 and 13 show a process and an apparatus, respectively, for receiving at least one overhead transmission with interference cancellation.

FIG. 12 shows a design of a process 1200 for receiving overhead transmissions with interference cancellation. Process 1200 may be performed by a UE (as described below), or a base station/eNB, or some other entity. The UE may obtain a received signal comprising at least one overhead transmission from a plurality of base stations (block 1212). The at least one overhead transmission may comprise a synchronization signal, or a broadcast channel, or some other overhead transmission, or a combination thereof. The plurality of base stations may comprise at least one interfering base station and at least one desired base station. The station may identify the at least one interfering base station based on received signal strength and/or some other measurement for each interfering base station. The UE may estimate interference due to the at least one overhead transmission from the at least one interfering base station (block 1214). The UE may cancel the estimated interference from the received signal to obtain an interference-canceled signal (block 1216). The UE may detect for the at least one overhead transmission from the at least one desired base station based on the interference-canceled signal (block 1218).

In one design, the UE may estimate and cancel the interference due to the at least one overhead transmission from one interfering base station at a time. For each interfering base station, the UE may detect for the at least one overhead transmission from that interfering base station and may then estimate and cancel the interference due to the at least one overhead transmission. The UE may also estimate and cancel interference for all interfering base stations in one round, or for one group of interfering base stations in each round.

Figure 13:
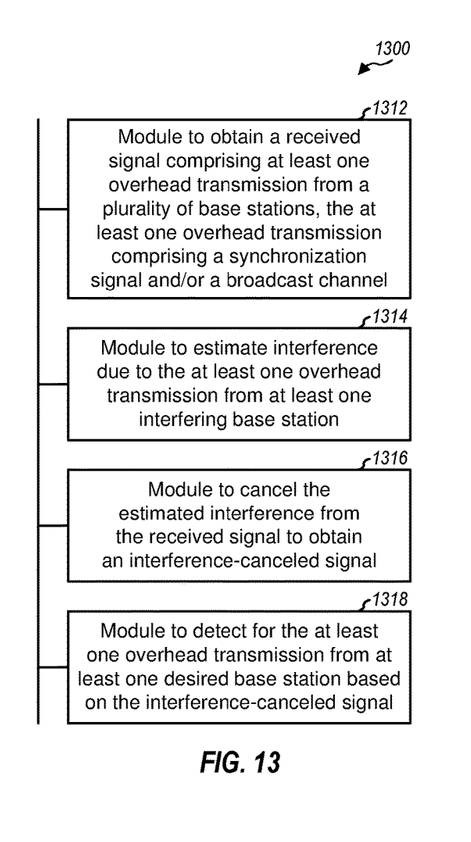

FIG. 13 shows a design of an apparatus 1300 for receiving overhead transmissions with interference cancellation. Apparatus 1300 includes a module 1312 to obtain a received signal comprising at least one overhead transmission from a plurality of base stations, the at least one overhead transmission comprising a synchronization signal and/or a broadcast channel, a module 1314 to estimate interference due to the at least one overhead transmission from at least one interfering base station, a module 1316 to cancel the estimated interference from the received signal to obtain an interference-canceled signal, and a module 1318 to detect for the at least one overhead transmission from at least one desired base station based on the interference-canceled signal.

The modules in FIGS. 7, 9, 11 and 13 may comprise processors, electronic devices, hardware devices, electronic components, logical circuits, memories, software codes, firmware codes, etc., or any combination thereof.

Figure 14:
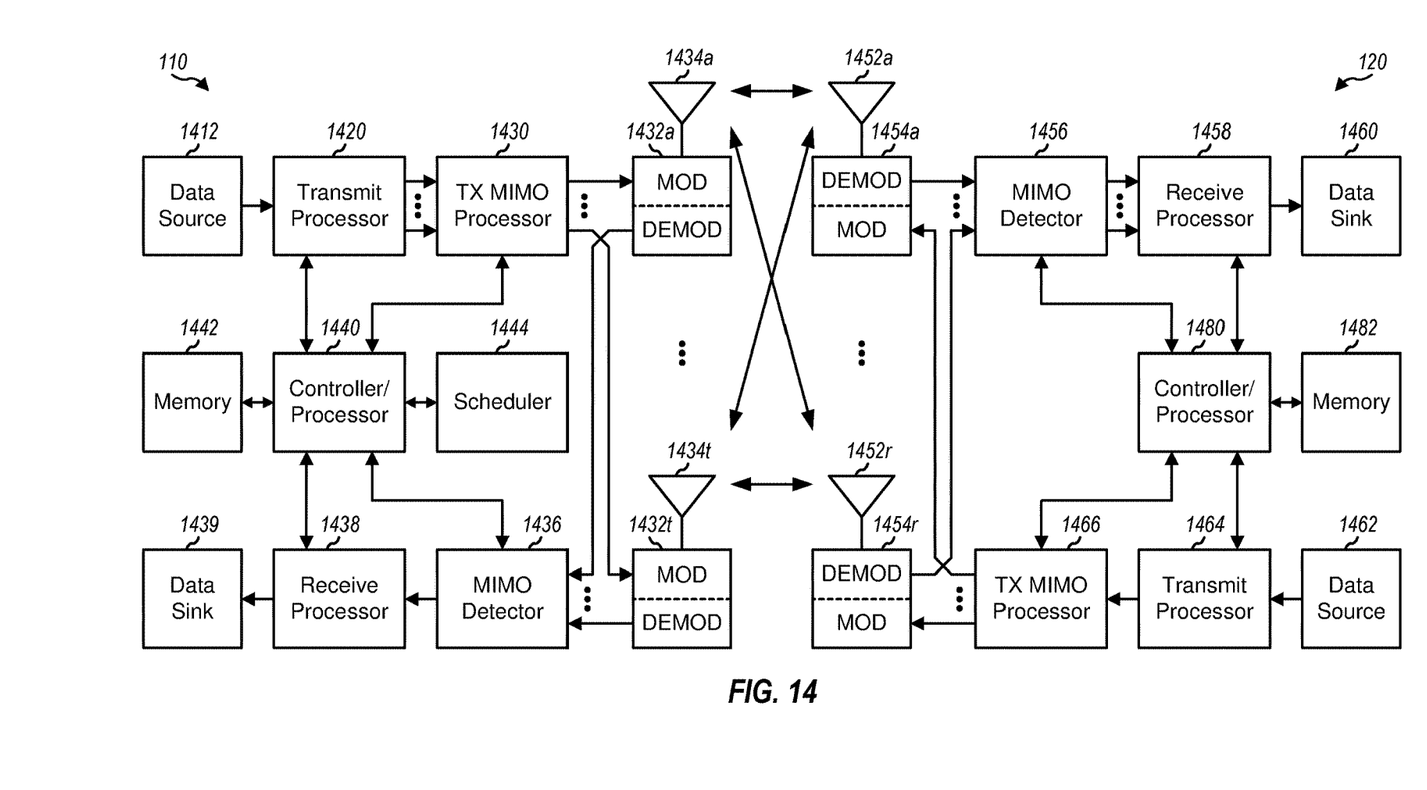
FIG. 14 shows a block diagram of a base station and a UE.

FIG. 14 shows a block diagram of a design of base station/eNB 110 and UE 120, which may be one of the base stations/eNBs and one of the UEs in FIG. 1. Base station 110 may be equipped with T antennas 1434a through 1434t, and UE 120 may be equipped with R antennas 1452a through 1452r, where in general T≥1 and R≥1.

At base station 110, a transmit processor 1420 may receive data from a data source 1412 for one or more UEs, process (e.g., encode and modulate) the data for each UE based on one or more modulation and coding schemes selected for that UE, and provide data symbols for all UEs. Transmit processor 1420 may also process control information and overhead information (e.g., for the PBCH) and provide control symbols and overhead symbols. Processor 1420 may also generate reference symbols for synchronization signals (e.g., the PSS and SSS) and reference signals (e.g., the CRS). A transmit (TX) multiple-input multiple-output (MIMO) processor 1430 may perform spatial processing (e.g., precoding) on the data symbols, the control symbols, the overhead symbols, and/or the reference symbols, if applicable, and may provide T output symbol streams to T modulators (MODs) 1432a through 1432t. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink signal. T downlink signals from modulators 1432a through 1432t may be transmitted via T antennas 1434a through 1434t, respectively.

At UE 120, antennas 1452a through 1452r may receive the downlink signals from base station 110 and/or other base stations and may provide received signals to demodulators (DEMODs) 1454a through 1454r, respectively. Each demodulator 1454 may condition (e.g., filter, amplify, downconvert, and digitize) its received signal to obtain input samples. Each demodulator 1454 may further process the input samples (e.g., for OFDM, etc.) to obtain received symbols. A MIMO detector 1456 may obtain received symbols from all R demodulators 1454a through 1454r, perform MIMO detection on the received symbols if applicable, and provide detected symbols. A receive processor 1458 may process (e.g., demodulate and decode) the detected symbols, provide decoded data for UE 120 to a data sink 1460, and provide decoded control information and overhead information to a controller/processor 1480.

On the uplink, at UE 120, a transmit processor 1464 may receive and process data from a data source 1462 and control information from controller/processor 1480. Processor 1464 may also generate reference symbols for one or more reference signals. The symbols from transmit processor 1464 may be precoded by a TX MIMO processor 1466 if applicable, further processed by modulators 1454a through 1454r (e.g., for SC-FDM, OFDM, etc.), and transmitted to base station 110. At base station 110, the uplink signals from UE 120 and other UEs may be received by antennas 1434, processed by demodulators 1432, detected by a MIMO detector 1436 if applicable, and further processed by a receive processor 1438 to obtain decoded data and control information sent by UE 120. Processor 1438 may provide the decoded data to a data sink 1439 and the decoded control information to controller/processor 1440.

Controllers/processors 1440 and 1480 may direct the operation at base station 110 and UE 120, respectively. Processor 1440 and/or other processors and modules at base station 110 may perform or direct process 600 in FIG. 6, process 800 in FIG. 8, process 1000 in FIG. 10, process 1200 in FIG. 12, and/or other processes for the techniques described herein. Processor 1480 and/or other processors and modules at UE 120 may perform or direct process 1000 in FIG. 10, process 1200 in FIG. 12, and/or other processes for the techniques described herein. Memories 1442 and 1482 may store data and program codes for base station 110 and UE 120, respectively. A scheduler 1444 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method for wireless communication, comprising:
   obtaining a received signal comprising overhead signals of at least one desired base station as well as at least one interfering base station;

processing samples of the received signal to detect for each of the at least one interfering base station having a received signal strength exceeding a particular threshold;

obtaining interference-canceled samples by estimating and canceling interference due to the overhead signals of each detected interfering base station; and processing the interference-canceled samples to detect for the overhead signals of the at least one desired base station.

2. An apparatus for wireless communication, comprising:

means for obtaining a received signal comprising overhead signals of at least one desired base station as well as at least one interfering base station;

means for processing samples of the received signal to detect for each of the at least one interfering base station having a received signal strength exceeding a particular threshold;

means for obtaining interference-canceled samples by estimating and canceling interference due to the overhead signals of each detected interfering base station; and means for processing the interference-canceled samples to detect for the overhead signals of the at least one desired base station.

3. An apparatus for wireless communication, comprising:

at least one processor configured to cause the apparatus to obtain a received signal comprising overhead signals of at least one desired base station as well as at least one interfering base station, to process samples of the received signal to detect for each of the at least one interfering base station having a received signal strength exceeding a particular threshold, to obtain interference-canceled samples by estimating and canceling interference due to the overhead signals of each detected interfering base station, and to process the interference-canceled samples to detect for the overhead signals of the at least one desired base station.

4. A computer program product, comprising:

a computer-readable medium comprising:

code for causing at least one computer to obtain a received signal comprising overhead signals of at least one desired base station as well as at least one interfering base station;

code for processing samples of the received signal to detect for each of the at least one interfering base station having a received signal strength exceeding a particular threshold;

code for obtaining interference-canceled samples by estimating and canceling interference due to the overhead signals of each detected interfering base station; and code for processing the interference-canceled samples to detect for the overhead signals of the at least one desired base station.

\* \* \* \* \*